(12) United States Patent
Balasubramanian et al.

(10) Patent No.: US 11,622,226 B2
(45) Date of Patent: Apr. 4, 2023

(54) DETERMINING AN OBJECT PRESENCE USING INFORMATION FROM VEHICLE USER EQUIPMENTS

(71) Applicant: QUALCOMM Incorporated, San Diego, CA (US)

(72) Inventors: Anantharaman Balasubramanian, San Diego, CA (US); Junyi Li, Chester, NJ (US); Dan Zhang, San Diego, CA (US); Kapil Gulati, Belle Mead, NJ (US); Chang-Sik Choi, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 17/110,733

(22) Filed: Dec. 3, 2020

(65) Prior Publication Data

US 2022/0182780 A1   Jun. 9, 2022

(51) Int. Cl.
*H04W 4/021*   (2018.01)
*H04W 4/46*   (2018.01)
*H04W 4/029*   (2018.01)

(52) U.S. Cl.
CPC ........... *H04W 4/021* (2013.01); *H04W 4/029* (2018.02); *H04W 4/46* (2018.02)

(58) Field of Classification Search
CPC ........ G08G 1/166; G08G 1/04; G08G 1/0116; G08G 1/0141; G08G 1/0133; G06V 10/25; G06V 20/54; H04W 4/029; H04W 4/44; H04W 84/18; H04W 4/021; H04W 4/46
See application file for complete search history.

(56) References Cited

U.S. PATENT DOCUMENTS

| 2017/0344888 A1* | 11/2017 | Sano .................... G05D 1/0257 |
| 2018/0035255 A1* | 2/2018 | Kordybach ............. H04W 4/46 |
| 2019/0088041 A1 | 3/2019 | Lee et al. |

FOREIGN PATENT DOCUMENTS

| DE | 10301290 A1 * | 8/2003 | ......... B60R 21/0132 |
| EP | 3557893 A1 | 10/2019 | |
| WO | WO-2010110109 A1 * | 9/2010 | ............. G08G 1/166 |

OTHER PUBLICATIONS

International Search Report and Written Opinion—PCT/US2021/072208—ISA/EPO—dated Feb. 25, 2022.

\* cited by examiner

*Primary Examiner* — Dung Hong
(74) *Attorney, Agent, or Firm* — Harrity & Harrity LLP

(57) ABSTRACT

Various aspects of the present disclosure generally relate to wireless communication. In some aspects, a first vehicle user equipment (VUE) may transmit, to a node, first information associated with a presence of an object in a region of interest based at least in part on a sensing of the region of interest performed by the first VUE. The VUE may receive, from the node, second information associated with the presence of the object in the region of interest based at least in part on a sensing of the region of interest performed by a second VUE. The VUE may determine whether the object is present in the region of interest based at least in part on the first information and the second information. The VUE may perform an action based at least in part on whether the object is present in the region of interest. Numerous other aspects are provided.

30 Claims, 10 Drawing Sheets

DETERMINING AN OBJECT PRESENCE USING INFORMATION FROM VEHICLE USER EQUIPMENTS

FIELD OF THE DISCLOSURE

Aspects of the present disclosure generally relate to wireless communication and to techniques and apparatuses for determining an object presence using information from vehicle user equipments (VUEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first vehicle user equipment (VUE) includes transmitting, to a node, first information associated with a presence of an object in a region of interest based at least in part on a sensing of the region of interest performed by the first VUE; receiving, from the node, second information associated with the presence of the object in the region of interest based at least in part on a sensing of the region of interest performed by a second VUE; determining whether the object is present in the region of interest based at least in part on the first information and the second information; and performing an action based at least in part on whether the object is present in the region of interest.

In some aspects, a method of wireless communication performed by a node includes receiving, from a first VUE, first information associated with a presence of an object in a region of interest based at least in part on a sensing of the region of interest by the first VUE; receiving, from a second VUE, second information associated with the presence of the object in the region of interest based at least in part on a sensing of the region of interest by the second VUE; and transmitting third information based at least in part on the first information and the second information, wherein the third information indicates a probability associated with the presence of the object in the region of interest based at least in part on one or more of the sensing of the region of interest by the first VUE and the sensing of the region of interest by the second VUE.

In some aspects, a first VUE for wireless communication includes a memory and one or more processors operatively coupled to the memory, the memory and the one or more processors configured to: transmit, to a node, first information associated with a presence of an object in a region of interest based at least in part on a sensing of the region of interest performed by the first VUE; receive, from the node, second information associated with the presence of the object in the region of interest based at least in part on a sensing of the region of interest performed by a second VUE; determine whether the object is present in the region of interest based at least in part on the first information and the second information; and perform an action based at least in part on whether the object is present in the region of interest.

In some aspects, a node for wireless communication includes a memory and one or more processors operatively coupled to the memory, the memory and the one or more processors configured to: receive, from a first VUE, first information associated with a presence of an object in a region of interest based at least in part on a sensing of the region of interest by the first VUE; receive, from a second VUE, second information associated with the presence of the object in the region of interest based at least in part on a sensing of the region of interest by the second VUE; and transmit third information based at least in part on the first information and the second information, wherein the third information indicates a probability associated with the presence of the object in the region of interest based at least in part on one or more of the sensing of the region of interest by the first VUE and the sensing of the region of interest by the second VUE.

In some aspects, a non-transitory computer-readable medium storing a set of instructions for wireless communication includes one or more instructions that, when executed by one or more processors of a first VUE, cause the first VUE to: transmit, to a node, first information associated with a presence of an object in a region of interest based at least in part on a sensing of the region of interest performed by the first VUE; receive, from the node, second information associated with the presence of the object in the region of interest based at least in part on a sensing of the region of interest performed by a second VUE; determine whether the object is present in the region of interest based at least in part on the first information and the second information; and perform an action based at least in part on whether the object is present in the region of interest.

In some aspects, a non-transitory computer-readable medium storing a set of instructions for wireless communication includes one or more instructions that, when executed by one or more processors of a node, cause the node to: receive, from a first VUE, first information associated with a presence of an object in a region of interest based at least in part on a sensing of the region of interest by the first VUE; receive, from a second VUE, second information associated with the presence of the object in the region of interest based at least in part on a sensing of the region of interest by the second VUE; and transmit third information based at least in part on the first information and the second information, wherein the third information indicates a probability associated with the presence of the object in the region of interest based at least in part on one or more of the sensing of the region of interest by the first VUE and the sensing of the region of interest by the second VUE.

In some aspects, a first apparatus for wireless communication includes means for transmitting, to a node, first information associated with a presence of an object in a region of interest based at least in part on a sensing of the region of interest performed by the first apparatus; means for receiving, from the node, second information associated with the presence of the object in the region of interest based at least in part on a sensing of the region of interest performed by a second apparatus; means for determining whether the object is present in the region of interest based at least in part on the first information and the second information; and means for performing an action based at least in part on whether the object is present in the region of interest.

In some aspects, an apparatus for wireless communication includes means for receiving, from a first VUE, first information associated with a presence of an object in a region of interest based at least in part on a sensing of the region of interest by the first VUE; means for receiving, from a second VUE, second information associated with the presence of the object in the region of interest based at least in part on a sensing of the region of interest by the second VUE; and means for transmitting third information based at least in part on the first information and the second information, wherein the third information indicates a probability associated with the presence of the object in the region of interest based at least in part on one or more of the sensing of the region of interest by the first VUE and the sensing of the region of interest by the second VUE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
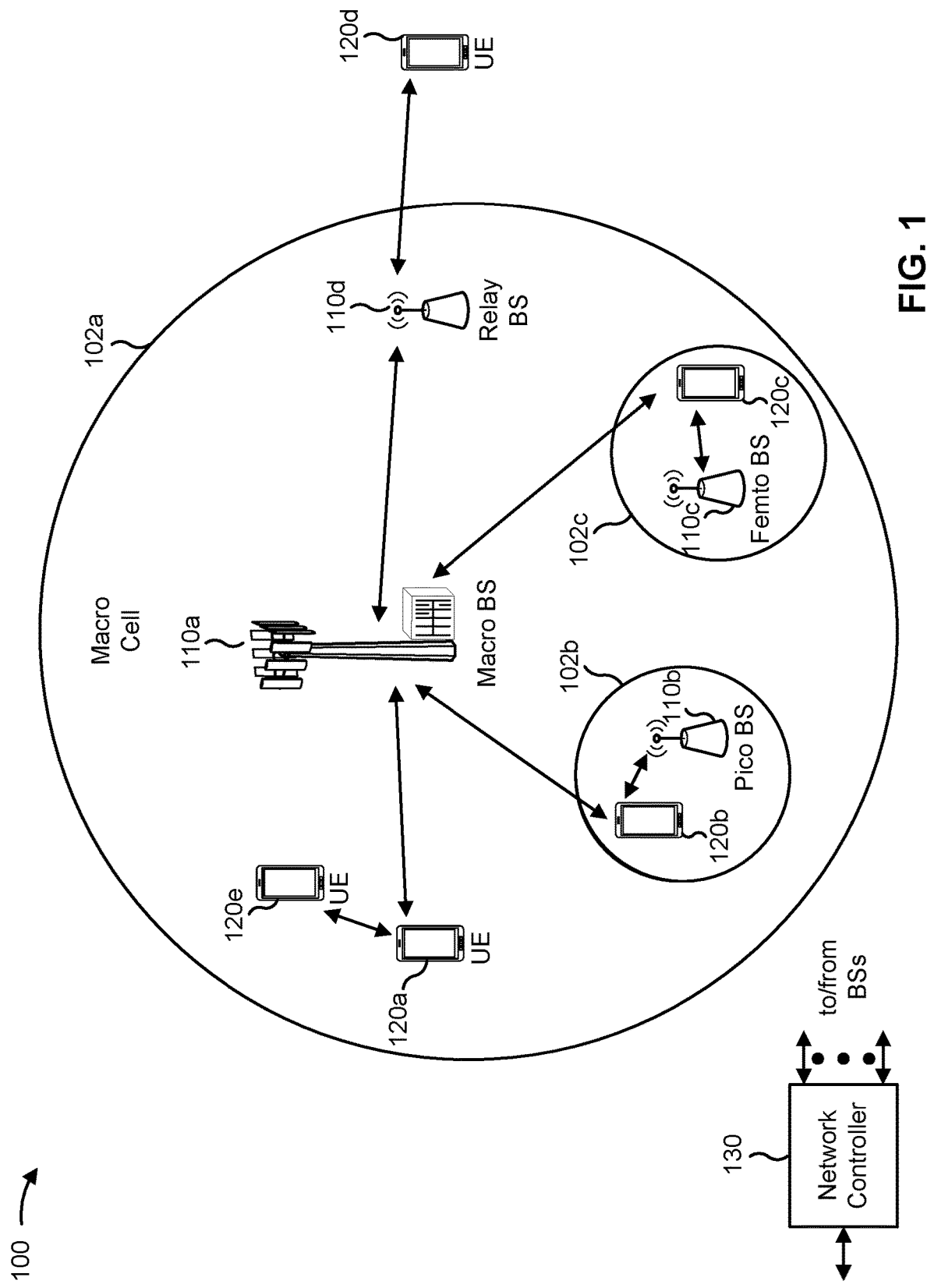
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-person (V2P) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
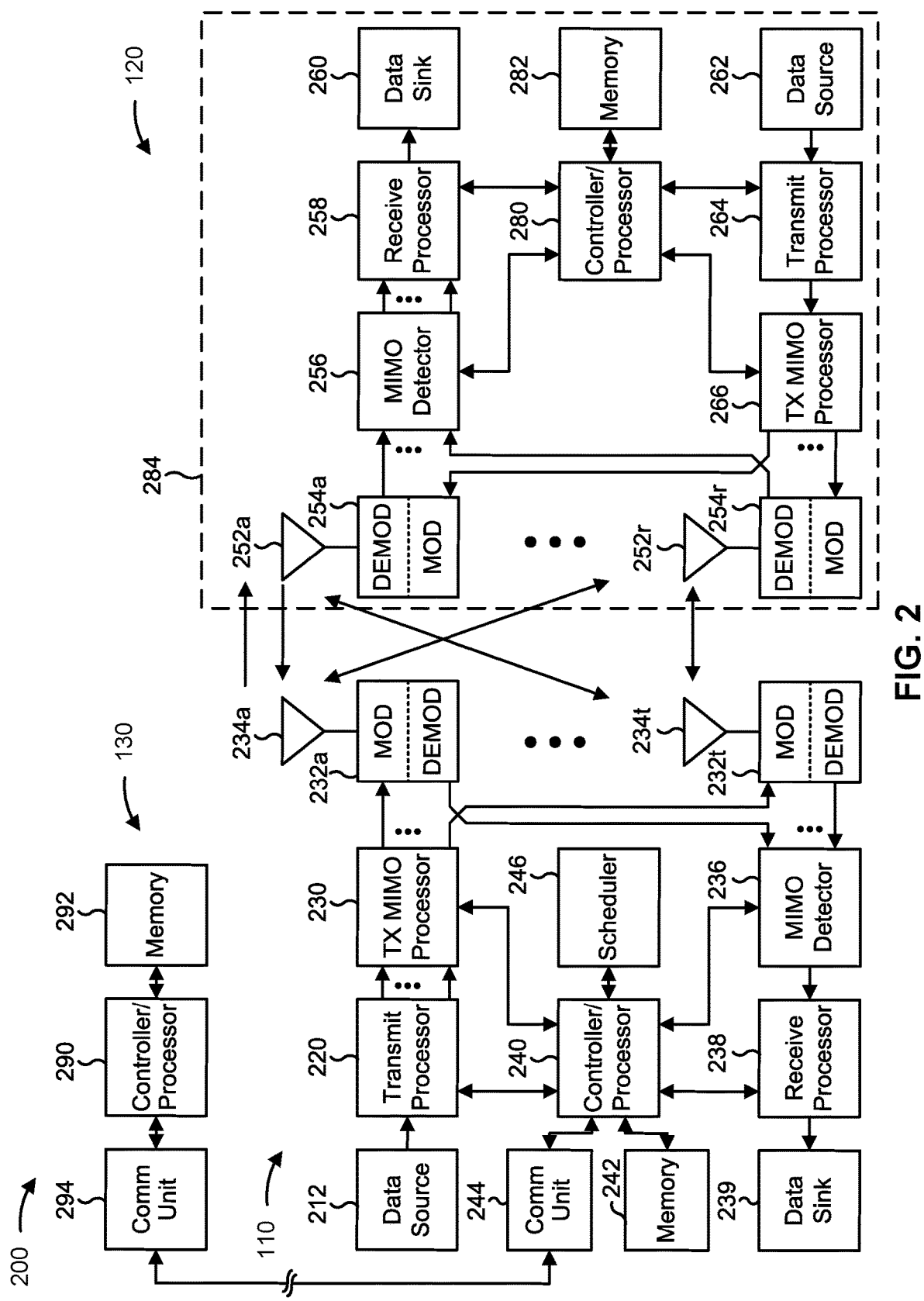
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-6.

Controller/processor 240 of base station 110, controller/processor 280 of UE 120, and/or any other component(s) of FIG. 2 may perform one or more techniques associated with determining an object presence using information from vehicle user equipments (VUEs), as described in more detail elsewhere herein. In some aspects, the node described herein is the base station 110, is included in the base station 110, or includes one or more components of the base station 110 shown in FIG. 2. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the first VUE includes means for transmitting, to a node, first information associated with a presence of an object in a region of interest based at least in part on a sensing of the region of interest performed by the first VUE; means for receiving, from the node, second information associated with the presence of the object in the region of interest based at least in part on a sensing of the region of interest performed by a second VUE; means for determining whether the object is present in the region of interest based at least in part on the first information and the second information; and/or means for performing an action based at least in part on whether the object is present in the region of interest. The means for the VUE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the first VUE includes means for determining that the object is present in the region of interest based at least in part on the first information and the second information.

In some aspects, the first VUE includes means for determining the first information based at least in part on a monitoring of the region of interest, wherein the monitoring includes the sensing of the region of interest.

In some aspects, the node includes means for receiving, from a first VUE, first information associated with a presence of an object in a region of interest based at least in part on a sensing of the region of interest by the first VUE; means for receiving, from a second VUE, second information associated with the presence of the object in the region of interest based at least in part on a sensing of the region of interest by the second VUE; and/or means for transmitting third information based at least in part on the first information and the second information, wherein the third information indicates a probability associated with the presence of the object in the region of interest based at least in part on one or more of the sensing of the region of interest by the first VUE and the sensing of the region of interest by the second VUE. In some aspects, the means for the node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the node includes means for transmitting, via a broadcast message, the third information to one or more of the first VUE, the second VUE, or a third VUE that does not monitor the region of interest; and/or means for transmitting, via a unicast message, the third information to the first VUE or the second VUE.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In a V2P system, a VUE may determine positions of surrounding objects, such as vulnerable road users (VRUs)

or pedestrians, to avoid potential collisions. In some cases, the VUE may be unable to determine certain objects. For example, occluding objects such as buildings may block a VRU at an intersection, thereby preventing the VUE from determining a presence of the VRU at the intersection. Certain geographic locations, such as intersections, may be associated with a relatively high collision potential for VRUs due to occluding objects limiting a sensing capability of VUEs.

In view of this problem, VUEs may share sensor information regarding sensed objects with other VUEs, thereby providing the VUEs with a global view of objects in a region. However, object sensing by VRUs are prone to errors, such as location errors of objects being sensed due to inherent sensor errors and/or data association errors. Data association errors may occur when bounding boxes of VRUs overlap with each other. With respect to VRUs and the importance of safety, object sensing may be performed independently by a VUE and cooperatively with other VUEs to ensure a presence or absence of a VRU.

Figure 3:
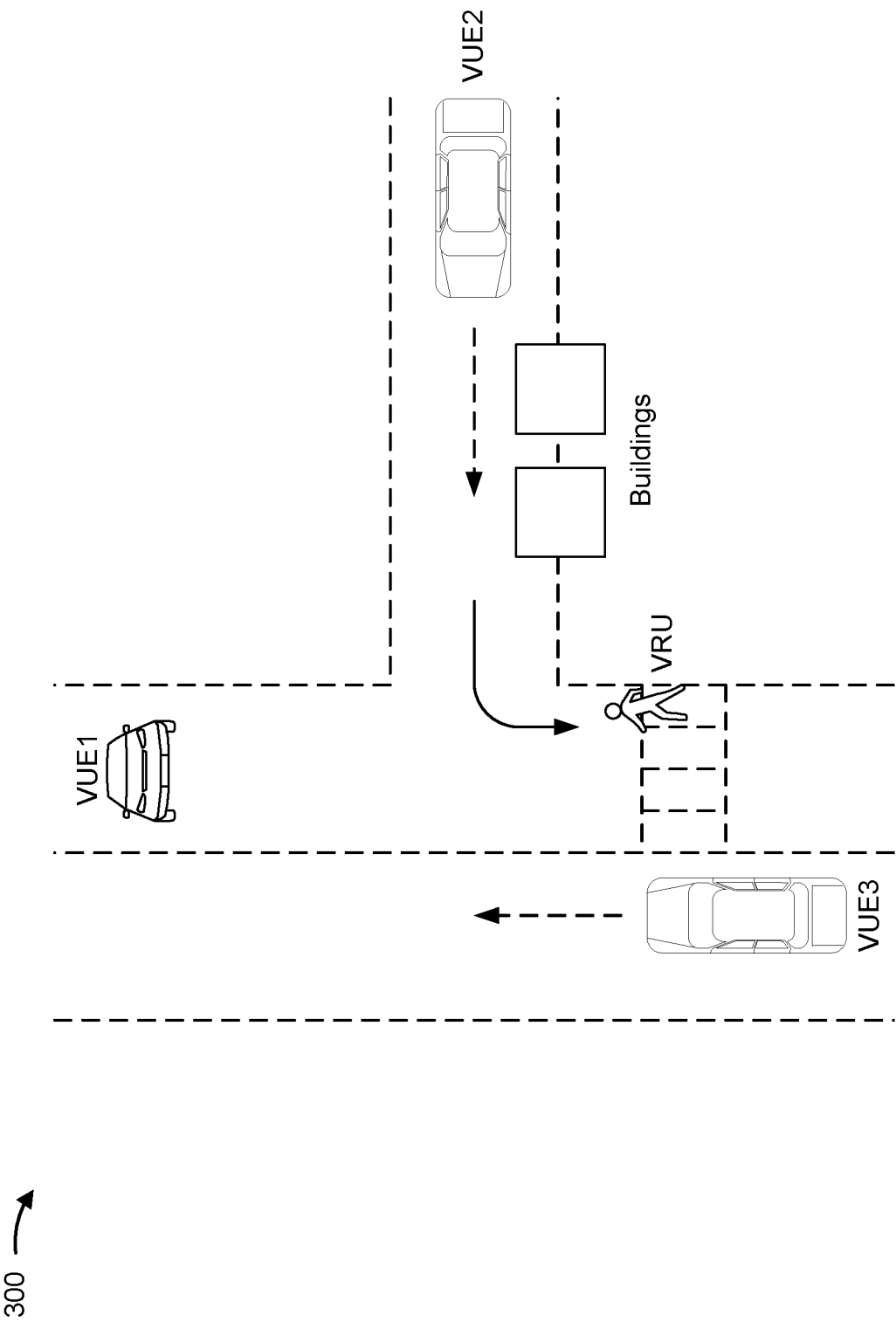
FIG. 3 is a diagram illustrating an example of occluding objects blocking an object at an intersection, in accordance with various aspects of the present disclosure.

FIG. 3 is a diagram illustrating an example 300 of occluding objects blocking an object at an intersection, in accordance with various aspects of the present disclosure.

As shown in FIG. 3, a VRU may be crossing an intersection. A first VUE (VUE1) may have a line of sight to the VRU, so the first VUE may be able to sense the VRU. The VRU may be sensed using various sensors, such as a camera, radar, and/or light detection and ranging (LIDAR). A third VUE (VUE3) may also have a line of sight to the VRU, so the third VUE may be able to sense the VRU. However, a second VUE (VUE2) may be about to turn and cross the intersection, but occluding objects (e.g., buildings) may prevent the second VUE from sensing the VRU. The second VUE may be able to receive a pedestrian safety message from the VRU. The pedestrian safety message may be unable to convey an accurate location of the VRU due to high global positioning system (GPS) errors caused by the surrounding occluding objects. Thus, the second VUE may be unable to reliably estimate a presence of the VRU at the intersection.

As indicated above, FIG. 3 is provided as an example. Other examples may differ from what is described with regard to FIG. 3.

In various aspects of techniques and apparatuses described herein, a first VUE may transmit first intrinsic information to a node, such as a roadside unit (RSU). The first intrinsic information may be associated with a presence of an object (e.g., a VRU) in a region of interest based at least in part on sensing in the region of interest performed by the first VUE. A second VUE may transmit second intrinsic information to the node, where the second intrinsic information may be associated with the presence of the object in the region of interest based at least in part on sensing in the region of interest performed by the second VUE. In other words, the first intrinsic information may correspond to a perception of the first VUE in the region of interest, so may be considered as being intrinsic to the first VUE. The second intrinsic information may correspond to a perception of the second VUE in the region of interest, so may be considered as being intrinsic to the second VUE.

In various aspects of techniques and apparatuses described herein, the node may receive the first intrinsic information from the first VUE and the second intrinsic information from the second VUE. The node may transmit first extrinsic information to the first VUE and second extrinsic information to the second VUE. The first extrinsic information transmitted to the first VUE may include or be based at least in part on the second intrinsic information regarding the presence of the object in the region of interest, which was not originally possessed by the first VUE. The first extrinsic information may be combined intrinsic information of other VUEs reporting about the presence of the object. Combined intrinsic information may not be the same as a combination of all individual intrinsic information, as the combined intrinsic information may be aggregated intrinsic information. Similarly, the second extrinsic information transmitted to the second VUE may include or be based at least in part on the first intrinsic information regarding the presence of the object in the region of interest, which was not originally possessed by the second VUE. The first VUE may determine whether the object is present in the region of interest based at least in part on the first intrinsic information and the second intrinsic information. The second VUE may determine whether the object is present in the region of interest based at least in part on the second intrinsic information and the second extrinsic information. Thus, the first VUE may infer the presence of the object in the region of interest by cooperatively combining information sensed by the first VUE and information sensed by the second VUE, and vice versa.

In various aspects of techniques and apparatuses described herein, the first VUE may use sensor information obtained by the second VUE that is not available to the first VUE. For example, the first VUE may not be able to sense an object, but the second VUE may be able to sense this object. In this example, the first VUE may be able to detect a presence of the object based at least in part on sensor information obtained by the second VUE. As a result, VUEs may reliably infer the presence of objects (e.g., VRUs) by cooperatively fusing sensed measurements from other VUEs.

Figure 4:
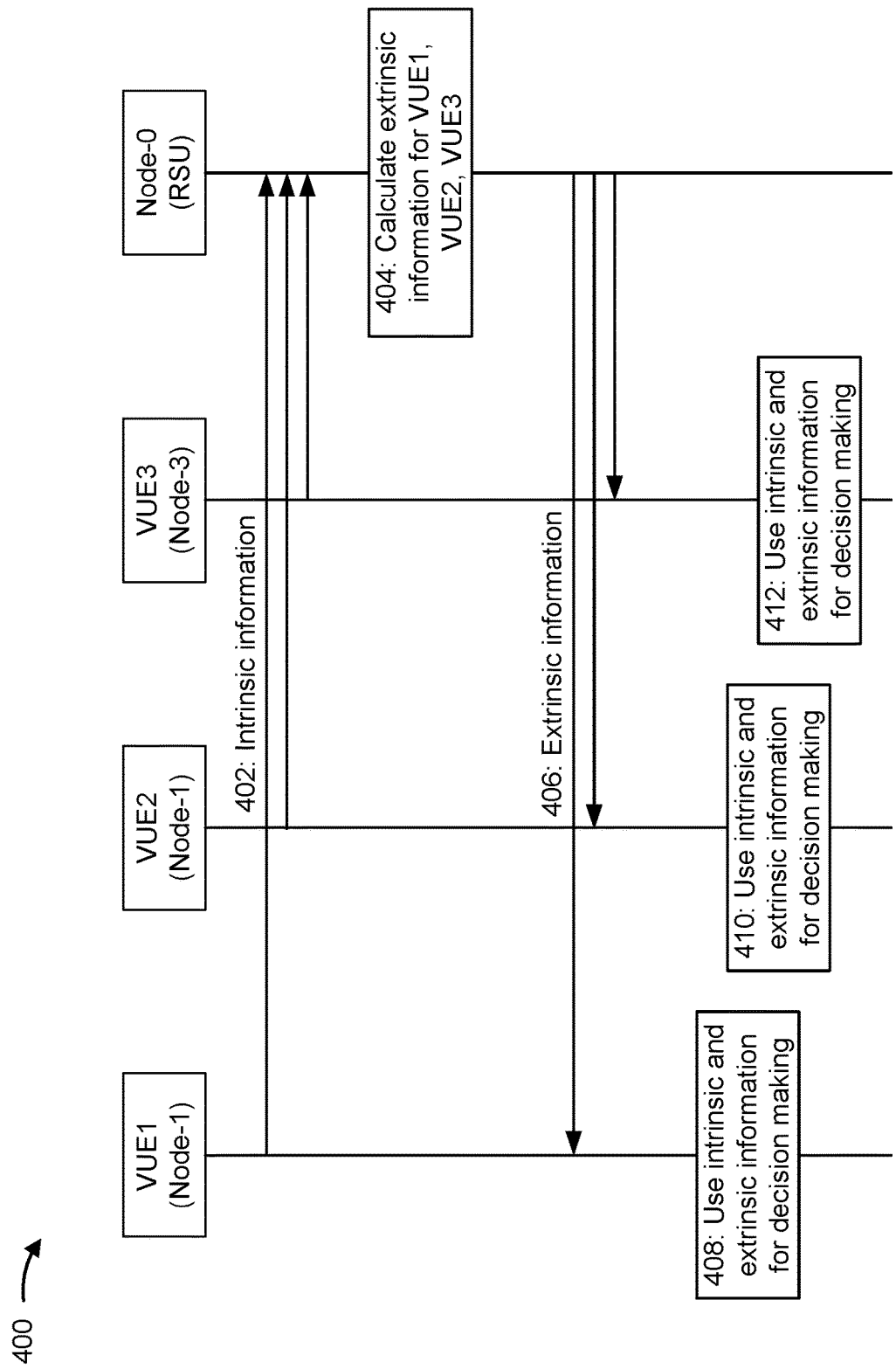
FIGS. 4-6 are diagrams illustrating examples associated with determining an object presence using information from one or more VUEs, in accordance with various aspects of the present disclosure.

FIG. 4 is a diagram illustrating an example 400 associated with determining an object presence using information from VUEs, in accordance with various aspects of the present disclosure. As shown in FIG. 4, example 400 includes communication between VUEs (e.g., UEs 120) and a node (e.g., base station 110). In some aspects, the VUEs and the node may be included in a wireless network such as wireless network 100. The VUEs and the node may communicate on a wireless sidelink.

As shown by reference number 402, a first VUE (VUE1 or Node-1) may transmit first intrinsic information to a node (Node-0 or RSU), a second VUE (VUE2 or Node-2) may transmit second intrinsic information to the node, and a third VUE (VUE3 or Node-3) may transmit third intrinsic information to the node. The first intrinsic information may be associated with a presence of an object in a region of interest based at least in part on a sensing of the region of interest performed by the first VUE. The second intrinsic information may be associated with the presence of the object in the region of interest based at least in part on a sensing of the region of interest performed by the second VUE. The third intrinsic information may be associated with the presence of the object in the region of interest based at least in part on a sensing of the region of interest performed by the third VUE.

As used herein, "intrinsic information" may be transmitted by a VUE and may refer to information associated with a presence of an object in a region of interest based at least in part on a sensing of the region of interest performed by the VUE, and not by sensing of the region of interest performed by other VUEs.

In some aspects, the first intrinsic information transmitted by the first VUE may correspond to a perception of a sensed object of the first VUE. The second intrinsic information transmitted by the second VUE may correspond to the perception of the sensed object of the second VUE. The third intrinsic information transmitted by the third VUE may correspond to the perception of the sensed object of the third VUE. In other words, intrinsic information transmitted by a VUE may correspond to the VUE's own perception of a sensed object in a region of interest.

In some aspects, intrinsic information (e.g., the first intrinsic information, the second intrinsic information, and/or the third intrinsic information) may indicate that the object is present in the region of interest, or that the object is absent from the region of interest. The intrinsic information may include a first value (e.g., "1") to indicate that the object is sensed in the region of interest, or a second value (e.g., "0") to indicate that the object is not sensed in the region of interest. In some aspects, the intrinsic information may indicate a confidence level corresponding to the presence of the object in the region of interest. For example, a high confidence level may indicate that the object is present in the region of interest, whereas a low confidence level may indicate that the object is absent from the region of interest. In some aspects, the intrinsic information may be determined based at least in part on a monitoring of the region of interest, where the monitoring may include sensing the region of interest.

In some aspects, the region of interest may be preconfigured for the first VUE, the second VUE, and the third VUE. Alternatively, the region of interest may be configured at the first VUE, the second VUE, and the third VUE by the node.

As shown by reference number 404, the node may determine extrinsic information for each of the first VUE, the second VUE, and the third VUE. For example, the node may determine first extrinsic information for the first VUE, second extrinsic information for the second VUE, and third extrinsic information for the third VUE. The first extrinsic information, which may be determined for the first VUE, may be associated with the presence of the object in the region of interest based at least in part on the sensing of the region of interest performed by the second VUE and the third VUE. The second extrinsic information, which may be determined for the second VUE, may be associated with the presence of the object in the region of interest based at least in part on the sensing of the region of interest performed by the first VUE and the third VUE. The third extrinsic information, which may be determined for the third VUE, may be associated with the presence of the object in the region of interest based at least in part on the sensing of the region of interest performed by the first VUE and the second VUE.

As used herein, "extrinsic information" may be received by a VUE and may refer to information associated with a presence of an object in a region of interest based at least in part on a sensing of the region of interest performed by VUEs other than the VUE that receives the extrinsic information.

In some aspects, the first extrinsic information transmitted to the first VUE may correspond to information not originally possessed by the first VUE. The first extrinsic information may be based at least in part on the second intrinsic information from the second VUE and the third intrinsic information from the third VUE. In some aspects, the second extrinsic information transmitted to the second VUE may correspond to information not originally possessed by the second VUE. The second extrinsic information may be based at least in part on the first intrinsic information from the first VUE and the third intrinsic information from the third VUE. In some aspects, the third extrinsic information transmitted to the third VUE may correspond to information not originally possessed by the third VUE. The third extrinsic information may be based at least in part on the first intrinsic information from the first VUE and the second intrinsic information from the second VUE. In other words, extrinsic information transmitted to a VUE may correspond to intrinsic information from other VUEs (e.g., information resulting from sensing of a region of interest by other VUEs).

In some aspects, the first extrinsic information may indicate a probability associated with the presence of the object in the region of interest based at least in part on the sensing by the second VUE and the third VUE. The probability may be based at least in part on a number of VUEs other than the first VUE that report information (e.g., intrinsic information) indicating that the object is present in the region of interest, and a total number of VUEs other than the first VUE that report information (e.g., intrinsic information) associated with the presence of the object in the region of interest. Similarly, the second extrinsic information may indicate a probability associated with the presence of the object in the region of interest based at least in part on the sensing by the first VUE and the third VUE, and the third extrinsic information may indicate a probability associated with the presence of the object in the region of interest based at least in part on the sensing by the first VUE and the second VUE.

As shown by reference number 406, the node may transmit the first extrinsic information, the second extrinsic information, and the third extrinsic information to the first VUE, the second VUE, and the third VUE, respectively. For example, the node may transmit a first unicast information with the first extrinsic information to the first VUE, a second unicast information with the second extrinsic information to the second VUE, and a third unicast information with the third extrinsic information to the third VUE.

As shown by reference number 408, the first VUE may determine whether the object is present in the region of interest based at least in part on the first intrinsic information and the first extrinsic information. In other words, the first VUE may use the first intrinsic information, which may correspond to the sensing performed by the first VUE in the region of interest, as well as the first extrinsic information, which may correspond to the sensing performed by the second VUE and the third VUE in the region of interest, to determine whether the object is present in the region of interest. Further, the first VUE may perform an action based at least in part on whether the object is present in the region of interest. For example, the first VUE may perform various operations, such as a brake operation, an accelerate operation, a left turn operation, a right turn operation, a lane change operation, etc., depending on whether the object is present in the region of interest.

As shown by reference number 410, the second VUE may determine whether the object is present in the region of interest based at least in part on the second intrinsic information and the second extrinsic information. In other words, the second VUE may use the second intrinsic information, which may correspond to the sensing performed by the second VUE in the region of interest, as well as the second extrinsic information, which may correspond to the sensing performed by the first VUE and the third VUE in the region of interest, to determine whether the object is present in the region of interest. Further, the second VUE may perform an action based at least in part on whether the object is present in the region of interest.

As shown by reference number 412, the third VUE may determine whether the object is present in the region of interest based at least in part on the third intrinsic information and the third extrinsic information. In other words, the third VUE may use the third intrinsic information, which may correspond to the sensing performed by the third VUE in the region of interest, as well as the third extrinsic information, which may correspond to the sensing performed by the first VUE and the second VUE in the region of interest, to determine whether the object is present in the region of interest. Further, the third VUE may perform an action based at least in part on whether the object is present in the region of interest.

In some aspects, from the perspective of the first VUE, the first intrinsic information may indicate that the object is absent from the region of interest, and the second extrinsic information and the third extrinsic information may indicate that the object is present in the region of interest. In this case, the first VUE may determine that the object is present in the region of interest based at least in part on the first intrinsic information, the second extrinsic information, and the third extrinsic information. In other words, the first VUE may override an initial determination that the object is absent from the region of interest, when both the second extrinsic information and the third extrinsic information indicate that the object is present in the region of interest.

In some aspects, from the perspective of the first VUE, the first intrinsic information may indicate that the object is present in the region of interest, the second extrinsic information may indicate that the object is absent from the region of interest, and the third extrinsic information may indicate that the object is present in the region of interest. In this case, the first VUE may determine that the object is present in the region of interest based at least in part on the first intrinsic information, the second extrinsic information, and the third extrinsic information. In other words, even though the second extrinsic information may indicate that the object is absent from the region of interest, both the first intrinsic information and the third extrinsic information nay indicate that the object is present in the region of interest, so the first UE may not override an initial determination that the object is present in the region of interest.

In some aspects, the node may determine aggregated intrinsic information based at least in part on the first intrinsic information, the second intrinsic information, and the third intrinsic information. The aggregated intrinsic information may be based at least in part on the sensing performed by the first VUE, the sensing performed by the second VUE, and the sensing performed by the third VUE. The node may transmit a broadcast message with the aggregated intrinsic information for receipt at the first VUE, the second VUE, and the third VUE, instead of the node transmitting individual unicast messages containing extrinsic information specific to a certain VUE. The first VUE, the second VUE, and the third VUE may each receive the aggregated intrinsic information from the node. The first VUE may subtract first intrinsic information associated with the first VUE from the aggregated intrinsic information, which may result in first extrinsic information associated with the second VUE and the third VUE. The second VUE may subtract second intrinsic information associated with the second VUE from the aggregated intrinsic information, which may result in second extrinsic information associated with the first VUE and the third VUE. The third VUE may subtract third intrinsic information associated with the third VUE from the aggregated intrinsic information, which may result in third extrinsic information associated with the first VUE and the second VUE. In other words, a VUE may have intrinsic information associated with itself, so the VUE may subtract that intrinsic information from the aggregation intrinsic information to determine extrinsic information associated with other VUEs.

In some aspects, the node may transmit a broadcast message with the aggregated intrinsic information, which may be received at VUEs other than the first VUE, the second VUE, and the third VUE. The other VUEs may not monitor the region of interest, but may use the aggregated intrinsic information to determine whether objects are present in the region of interest. As a result, a VUE in a first region of interest may receive information regarding objects in a second region of interest, where the VUE in the first region of interest may be non-line-of-sight to the second region of interest.

In some aspects, the broadcast message may indicate a total number of VUEs that monitor the region of interest, and a total number of VUEs that report the presence of objects in the region of interest. A VUE may receive the broadcast message, and based at least in part on the broadcast message, the VUE may subtract intrinsic information associated with the VUE to determine extrinsic information specific to the VUE.

As indicated above, FIG. 4 is provided as an example. Other examples may differ from what is described with regard to FIG. 4.

Figure 5:
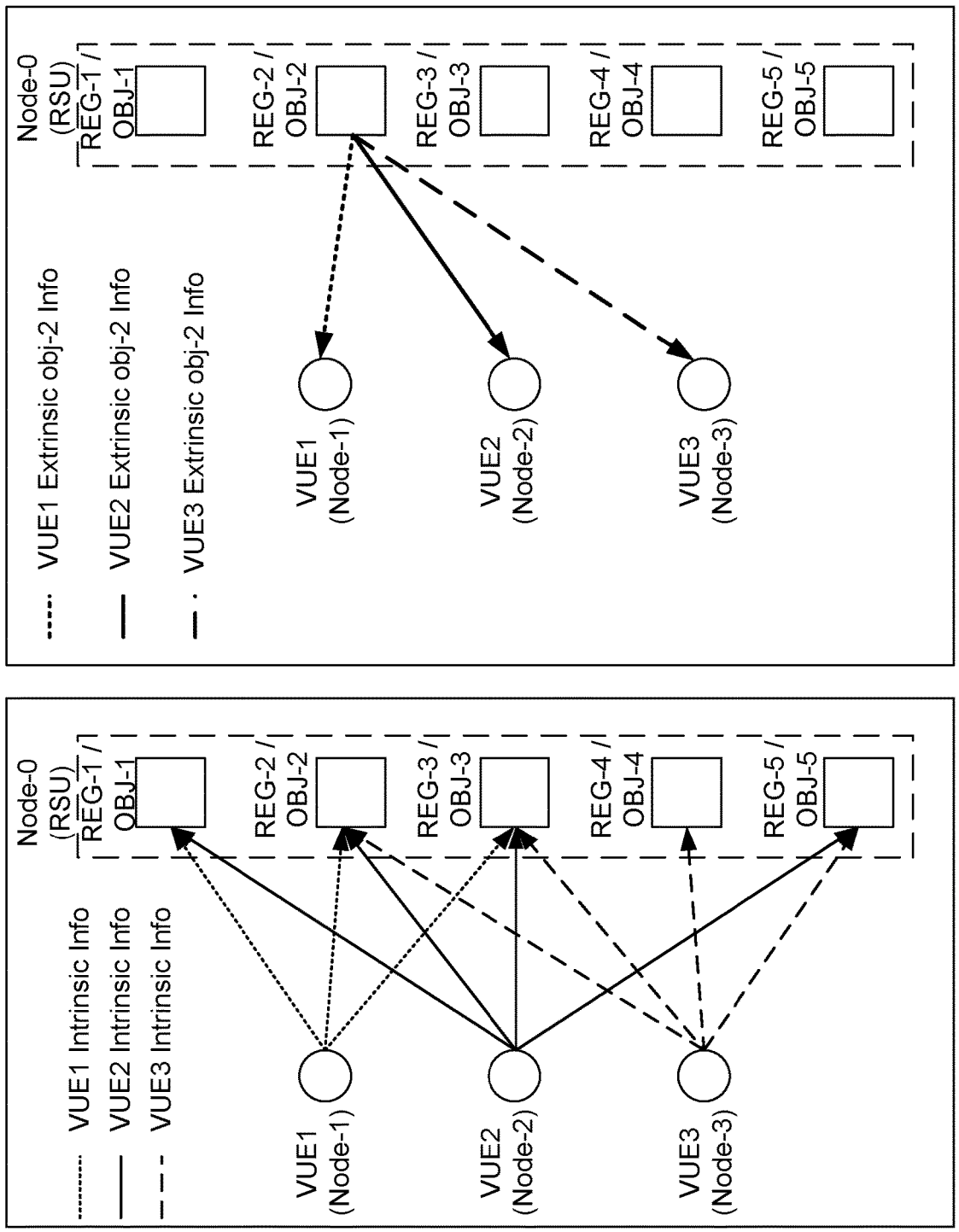

FIG. 5 is a diagram illustrating an example 500 associated with determining an object presence using information from VUEs, in accordance with various aspects of the present disclosure.

In the example shown in FIG. 5, a first VUE (VUE1 or Node-1) may monitor a first region of interest (REG-1), a second region of interest (REG-2), and a third region of interest (REG-3). The first VUE may determine first intrinsic information regarding a first object (OBJ-1) in the first region of interest, a second object (OBJ-2) in the second region of interest, and a third object (OBJ-3) in the third region of interest, and the first VUE may transmit the first intrinsic information to a node (Node-0 or RSU). In other words, the first VUE may transmit first intrinsic information of sensed object(s) at specific geographical location(s) to the node. The first intrinsic information may denote the first VUE's own perception of the sensed object(s). The second VUE (VUE2 or Node-2) may monitor the first region of interest, the second region of interest, the third region of interest, and a fifth region of interest (REG-5). The second VUE may determine second intrinsic information regarding the first object, the second object, the third object, and a fifth object (OBJ-5) in the fifth region of interest, and the second VUE may transmit the second intrinsic information to the node. The second intrinsic information may denote the second VUE's own perception of the sensed object(s). The third VUE (VUE3 or Node-3) may monitor the second region of interest, the third region of interest, a fourth region of interest (REG-4), and the fifth region of interest. The third VUE may determine third intrinsic information regarding the second object, the third object, a fourth object (OBJ-4) in the fourth region of interest, and the fifth object, and the third VUE may transmit the third intrinsic information to the node. The third intrinsic information may denote the third VUE's own perception of the sensed object(s).

In the example shown in FIG. 5, the node may transmit first extrinsic information to the first VUE related to a presence of the second object, where the first extrinsic information may be based at least in part on the second intrinsic information and the third intrinsic information related to the presence of the second object. The node may transmit second extrinsic information to the second VUE related to the presence of the second object, where the second extrinsic information may be based at least in part on the first intrinsic information and the third intrinsic information related to the presence of the second object. The node may transmit third extrinsic information to the third VUE related to the presence of the second object, where the third extrinsic information may be based at least in part on the first intrinsic information and the second intrinsic information related to the presence of the second object.

In some aspects, the first VUE, the second VUE, and the third VUE may transmit, to the node, the first intrinsic information, the second intrinsic information, and the third intrinsic information, respectively. The node may transmit extrinsic information to each of the first VUE, the second VUE, and the third VUE, where the extrinsic information may include information not originally possessed by each of the first VUE, the second VUE, and the third VUE. For example, first extrinsic information transmitted by the node to the first VUE may combine the second intrinsic information and the third intrinsic information obtained from the second VUE and the third VUE, respectively, which was not originally possessed by the first VUE. Second extrinsic information transmitted by the node to the second VUE may combine the first intrinsic information and the third intrinsic information obtained from the first VUE and the third VUE, respectively, which was not originally possessed by the second VUE. Third extrinsic information transmitted by the node to the third VUE may combine the first intrinsic information and the second intrinsic information obtained from the first VUE and the second VUE, respectively, which was not originally possessed by the third VUE.

In some aspects, VUEs may determine the presence of sensed objects based at least in part on intrinsic information and extrinsic information. For example, the first VUE may determine the presence of the sensed object based at least in part on the first intrinsic information, the second extrinsic information, and the third extrinsic information. The second VUE may determine the presence of the sensed object based at least in part on the second intrinsic information, the first extrinsic information, and the third extrinsic information. The third VUE may determine the presence of the sensed object based at least in part on the third intrinsic information, the first extrinsic information, and the second extrinsic information.

In some aspects, VUEs may perform object (e.g., VRU) detection in specific regions of interest. The regions of interest may correspond to geographical locations with relatively high VRU fatalities or VRU accidents, or the regions of interest may be unmanned VRU crossings. The regions of interest may be preconfigured, and/or the regions of interest may be explicitly configured by the node (e.g., an RSU).

In some aspects, a VUE may be (pre)configured to monitor specific VRU detection regions. The given VUE may monitor the specific VRU detection regions based on locations associated with the VRU detection regions. As an example, a first VUE in a first location (e.g., a geographical zone) may be configured to monitor a first set of VRU detection regions, while a second VUE in a second location may be configured to monitor a second set of VRU detection regions. The first set of VRU detection regions may or may not overlap with the second set of VRU detection regions. The first and second set of VRU detection regions may include one or more objects, such as VRUs. Thus, a VUE may monitor one or more VRU detection regions of interest, and a VRU detection region of interest may be monitored by one or more VUEs. In some aspects, the VRU detection regions of interest for the VRU may depend on a detection range of sensor(s) of the VRU, such as cameras, LIDAR, and/or radar.

In some aspects, the node may broadcast a listing of regions of interest, and a VUE may determine regions that the VUE is able to monitor from the listing of regions of interest. In this case, the VUE may report, to the node, a first value (e.g., "0") when an object is not detected, a second value (e.g., "1") for an object detected for a region of interest that is monitored by the VUE, or a third value (e.g., "NA") for other regions of interest that are not monitored by the VUE.

In some aspects, the node may not broadcast a listing of regions of interest. Rather, a VUE may report, to the node, regions of interest monitored by the VUE, and locations of objects (e.g., VRUs) detected or sensed in the regions of interest that are being monitored by the VUE. The node may receive reports from VUEs, and the node may dynamically configure the regions of interest based at least in part on the reports.

In some aspects, the first VUE, the second VUE, and the third VUE that transmit intrinsic information may be associated with nodes residing in VUEs, and the node that determines and transmits extrinsic information may also reside in a VUE. In this example, the node may not be an RSU, but rather may be associated with a VUE. Each VUE may provide extrinsic information based at least in part on intrinsic information obtained from a preconfigured set of VUEs with a distance that satisfies a threshold (e.g., a distance that is less than a threshold). In some aspects, intrinsic information from each VUE may describe a presence or absence of an object in a region of interest. Extrinsic information transmitted to one VUE may be a distribution obtained by combining intrinsic information from other VUEs, where the intrinsic information may be combined using a Kalman filter or by related techniques.

As indicated above, FIG. 5 is provided as an example. Other examples may differ from what is described with regard to FIG. 5.

Figure 6:
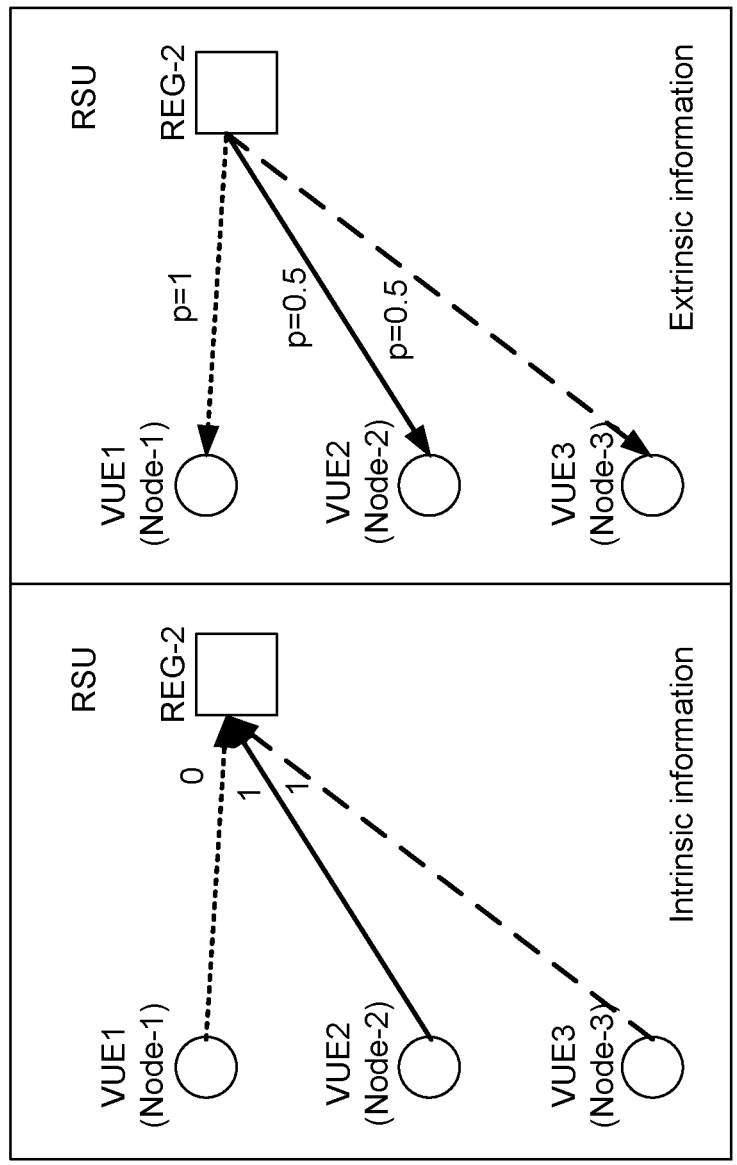

FIG. 6 is a diagram illustrating an example 600 associated with determining an object presence using information from VUEs, in accordance with various aspects of the present disclosure.

In the example shown in FIG. 6, a first VUE may transmit first intrinsic information including a value of "0", to a node, indicating that the first VUE does not detect a presence of an object in a region of interest (REG-2). The second VUE may transmit second intrinsic information including a value of "1", to the node, indicating that the second VUE detects the presence of the object in REG-2. The third VUE may transmit third second intrinsic information including a value of "1", to the node, indicating that the third VUE detects the presence of the object in REG-2.

In some aspects, the first intrinsic information, the second intrinsic information, and/or the third intrinsic information may be a real number that ranges from zero to one (or some other applicable scale), where the real number may be indicative of a confidence level. The confidence level may correlate to the object being present in the region of interest or the object being absent from the region of interest.

In the example shown in FIG. 6, the node may transmit first extrinsic information, to the first VUE, that includes a probability (p) of 1 associated with the presence of the object in REG-2. In this example, the first extrinsic information indicates that both the second VUE and the third VUE indicated that the object is present in REG-2 via intrinsic information. The node may transmit second extrinsic information, to the second VUE, that includes a probability (p) of 0.5 associated with the presence of the object in REG-2. In this example, the second extrinsic information indicates that one of the first VUE and the third VUE indicated that the object was present in REG-2 via intrinsic information, and the other VUE indicated that the object was absent from REG-2. The node may transmit third extrinsic information, to the third VUE, that includes a probability (p) of 0.5 associated with the presence of the object in REG-2. In this example, the third extrinsic information indicates that one of the first VUE and the second VUE indicated that the object was present in REG-2 via intrinsic information, and the other VUE indicated that the object was absent from REG-2.

In some aspects, extrinsic information including a probability (p) sent to Node-i (or VUE i) about region-j, denoted as $p(Node_i, REG_j)$ may be calculated as follows:

$$\frac{\text{Number of nodes other than } Node_i \text{ reporting about presence of object in } REG_j}{\text{Total number of nodes other than } Node_i \text{ reporting about } REG_j}.$$

In some aspects, a VUE i (Node-i) may possess both intrinsic information and extrinsic information related to $REG_j$, where the intrinsic information may be independent from the extrinsic information. The VUE i (Node-i) may determine whether an object (e.g., a VRU) is present in $REG_j$ based at least in part on the $p(Node_i, REG_j)$ satisfying (e.g., being greater than) a threshold. The VUE i (Node-i) may update an initial determination regarding a presence of the object in $REG_j$ based at least in part on the probability (p) indicated in the extrinsic information satisfying the threshold, where the extrinsic information may correspond to sensing performed by other VUEs.

In the example shown in FIG. 6, the first VUE may initially determine, as indicated by the intrinsic information from the first VUE, that no object is present in REG-2. However, the extrinsic information may include a $p(Node_1, REG_2)$ of 1, which indicates that the second VUE and the third VUE detected the presence of the object in REG-2. The $p(Node_1, REG_2)$ of 1 may satisfy the threshold. In this case, the first VUE may update original information about the object not being present in REG-2 to the object being present in REG-2.

In the example shown in FIG. 6, the third extrinsic information transmitted from the node to the third VUE for REG-2 may include a $p(Node_3, REG_2)$ of 0.5, which indicates that the first VUE did not detect the presence of the object in REG-2 and the second VUE detected the presence of the object in REG-2. The $p(Node_3, REG_2)$ of 0.5 may not satisfy the threshold. In this case, the third VUE may not update original information about the object being present in REG-2, since the third extrinsic information does not include a probability (p) that is greater than the threshold to warrant an update to the original information.

As indicated above, FIG. 6 is provided as an example. Other examples may differ from what is described with regard to FIG. 6.

Figure 7:
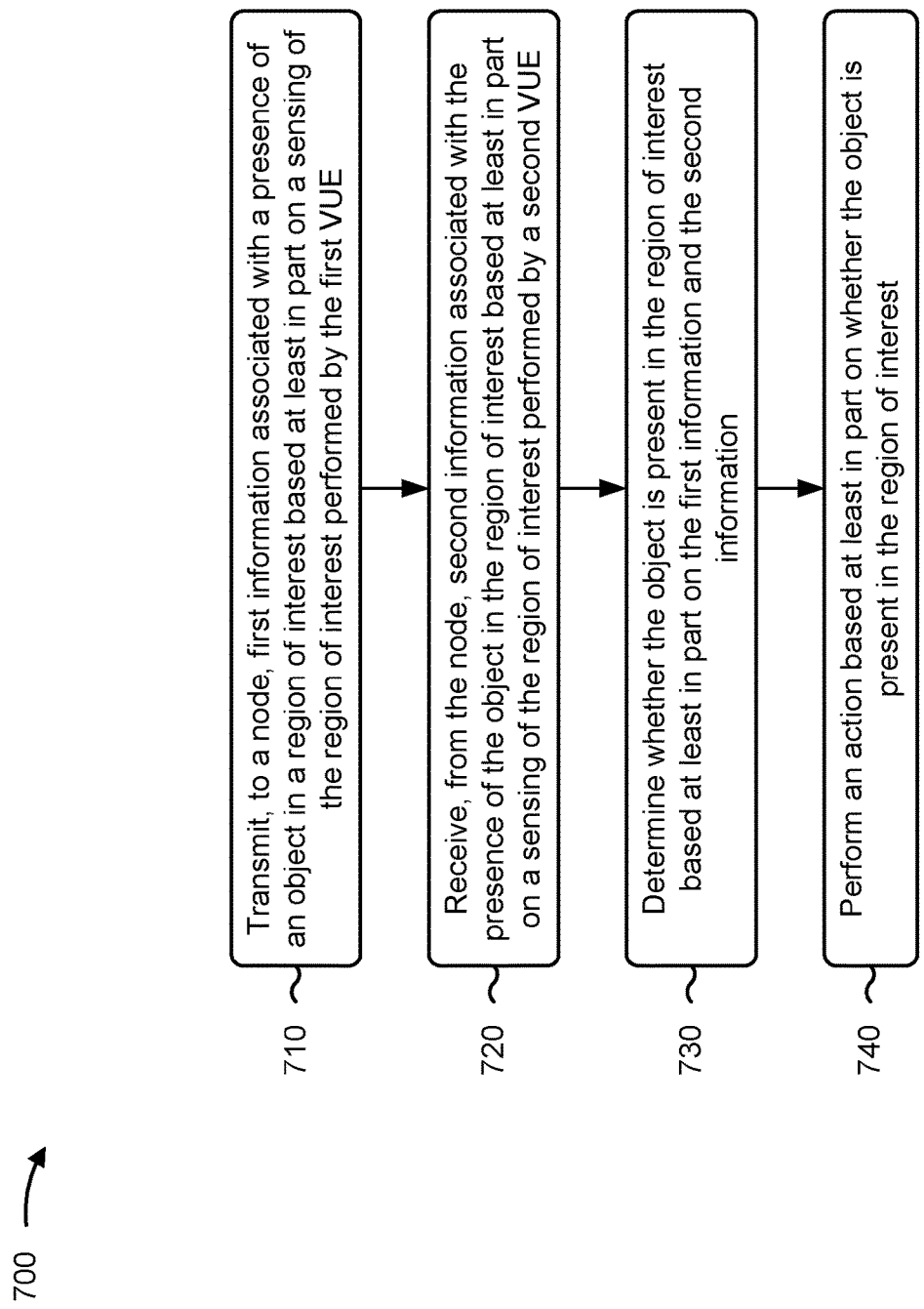
FIGS. 7-8 are diagrams illustrating example processes associated with determining an object presence using information from one or more VUEs, in accordance with various aspects of the present disclosure.

FIG. 7 is a diagram illustrating an example process 700 performed, for example, by a first VUE, in accordance with various aspects of the present disclosure. Example process 700 is an example where the first VUE (e.g., UE 120) performs operations associated with determining an object presence using information from VUEs.

As shown in FIG. 7, in some aspects, process 700 may include transmitting, to a node, first information associated with a presence of an object in a region of interest based at least in part on a sensing of the region of interest performed by the first VUE (block 710). For example, the first VUE (e.g., using transmission component 904, depicted in FIG. 9) may transmit, to a node, first information associated with a presence of an object in a region of interest based at least in part on a sensing of the region of interest performed by the first VUE, as described above.

As further shown in FIG. 7, in some aspects, process 700 may include receiving, from the node, second information associated with the presence of the object in the region of interest based at least in part on a sensing of the region of interest performed by a second VUE (block 720). For example, the first VUE (e.g., using reception component 902, depicted in FIG. 9) may receive, from the node, second information associated with the presence of the object in the region of interest based at least in part on a sensing of the region of interest performed by a second VUE, as described above.

As further shown in FIG. 7, in some aspects, process 700 may include determining whether the object is present in the region of interest based at least in part on the first information and the second information (block 730). For example, the first VUE (e.g., using determination component 908, depicted in FIG. 9) may determine whether the object is present in the region of interest based at least in part on the first information and the second information, as described above.

As further shown in FIG. 7, in some aspects, process 700 may include performing an action based at least in part on whether the object is present in the region of interest (block 740). For example, the first VUE (e.g., using performance component 910, depicted in FIG. 9) may perform an action based at least in part on whether the object is present in the region of interest, as described above.

Process 700 may include additional aspects, such as any single aspect or any combination of aspects described below and/or in connection with one or more other processes described elsewhere herein.

In a first aspect, the first information associated with the presence of the object in the region of interest indicates that the object is present in the region of interest or absent from the region of interest.

In a second aspect, alone or in combination with the first aspect, the first information indicates that the object is absent from the region of interest and the second information indicates that the object is present in the region of interest, and process 700 includes determining that the object is present in the region of interest based at least in part on the first information and the second information.

In a third aspect, alone or in combination with one or more of the first and second aspects, the first information indicates that the object is present in the region of interest and the second information indicates that the object is absent from the region of interest, and process 700 includes determining that the object is present in the region of interest based at least in part on the first information and the second information.

In a fourth aspect, alone or in combination with one or more of the first through third aspects, the first information associated with the presence of the object includes a first value to indicate that the object is sensed in the region of interest or a second value to indicate that the object is not sensed in the region of interest.

In a fifth aspect, alone or in combination with one or more of the first through fourth aspects, the first information associated with the presence of the object indicates a confidence level corresponding to the presence of the object.

In a sixth aspect, alone or in combination with one or more of the first through fifth aspects, the second information indicates a probability associated with the presence of the object in the region of interest based at least in part on the sensing by the second VUE.

In a seventh aspect, alone or in combination with one or more of the first through sixth aspects, the probability is based at least in part on a number of VUEs other than the first VUE that report information indicating that the object is present in the region of interest, and a total number of VUEs other than the first VUE that report information associated with the presence of the object in the region of interest.

In an eighth aspect, alone or in combination with one or more of the first through seventh aspects, the region of interest is preconfigured at the first VUE, or the region of interest is configured at the first VUE by the node or a base station.

In a ninth aspect, alone or in combination with one or more of the first through eighth aspects, process 700 includes determining the first information based at least in part on a monitoring of the region of interest, wherein the monitoring includes the sensing of the region of interest.

In a tenth aspect, alone or in combination with one or more of the first through ninth aspects, receiving the second information comprises receiving the second information from the node via a broadcast message, and the second information is based at least in part on the sensing of the region of interest performed by the first VUE and the sensing of the region of interest performed by the second VUE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
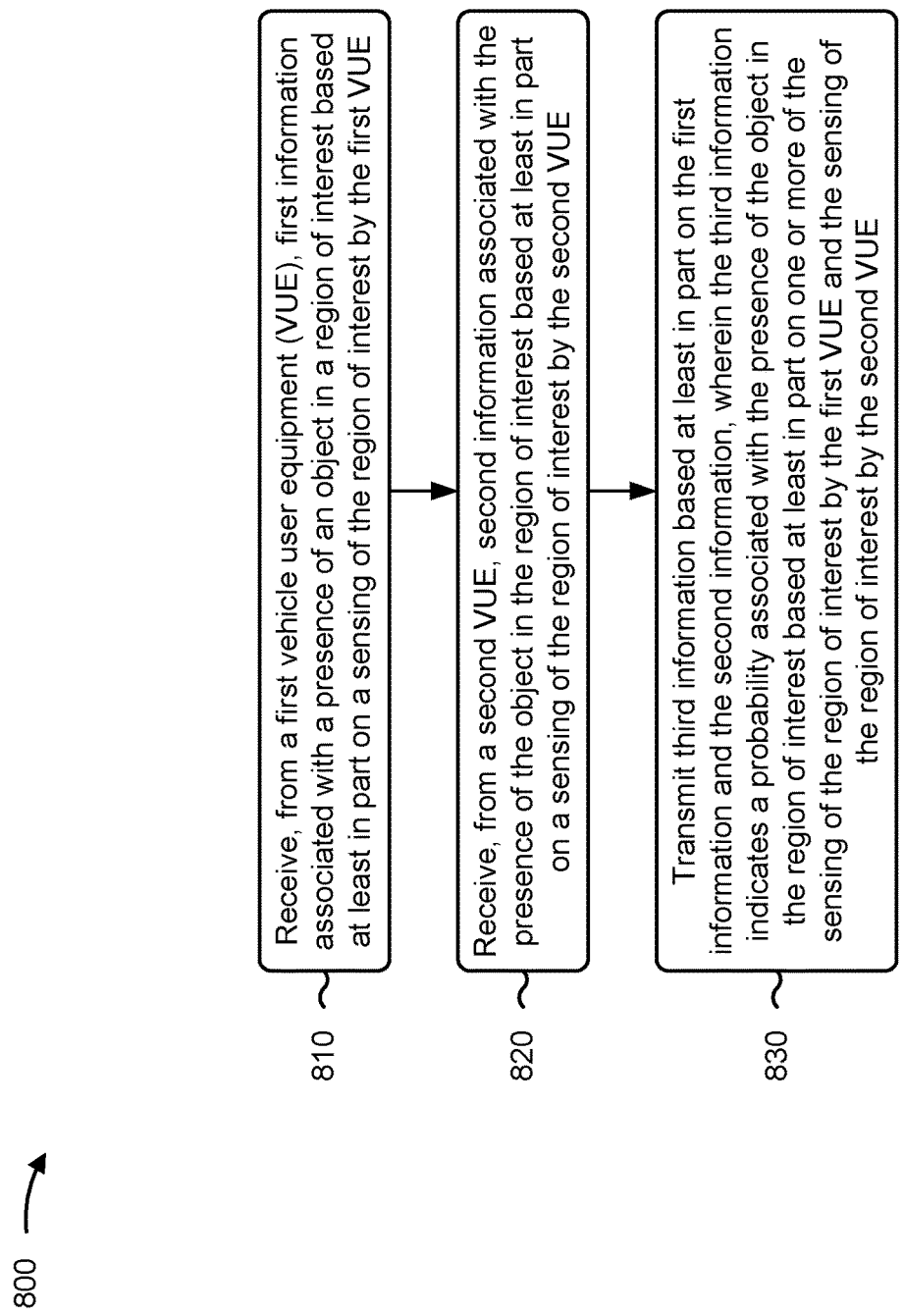

FIG. 8 is a diagram illustrating an example process 800 performed, for example, by a node, in accordance with various aspects of the present disclosure. Example process 800 is an example where the node (e.g., base station 110) performs operations associated with determining an object presence using information from VUEs.

As shown in FIG. 8, in some aspects, process 800 may include receiving, from a first VUE, first information associated with a presence of an object in a region of interest based at least in part on a sensing of the region of interest by the first VUE (block 810). For example, the node (e.g., using reception component 1002, depicted in FIG. 10) may receive, from a first VUE, first information associated with a presence of an object in a region of interest based at least in part on a sensing of the region of interest by the first VUE, as described above.

As further shown in FIG. 8, in some aspects, process 800 may include receiving, from a second VUE, second information associated with the presence of the object in the region of interest based at least in part on a sensing of the region of interest by the second VUE (block 820). For example, the node (e.g., using reception component 1002, depicted in FIG. 10) may receive, from a second VUE, second information associated with the presence of the object in the region of interest based at least in part on a sensing of the region of interest by the second VUE, as described above.

As further shown in FIG. 8, in some aspects, process 800 may include transmitting third information based at least in part on the first information and the second information, wherein the third information indicates a probability associated with the presence of the object in the region of interest based at least in part on one or more of the sensing of the region of interest by the first VUE and the sensing of the region of interest by the second VUE (block 830). For example, the node (e.g., using transmission component 1004, depicted in FIG. 10) may transmit third information based at least in part on the first information and the second information, wherein the third information indicates a probability associated with the presence of the object in the region of interest based at least in part on one or more of the sensing of the region of interest by the first VUE and the sensing of the region of interest by the second VUE, as described above.

Process 800 may include additional aspects, such as any single aspect or any combination of aspects described below and/or in connection with one or more other processes described elsewhere herein.

In a first aspect, the first information associated with the presence of the object includes a first value to indicate that the object is sensed in the region of interest or a second value to indicate that the object is not sensed in the region of interest, and the second information associated with the presence of the object includes a third value to indicate that the object is sensed in the region of interest or a fourth value to indicate that the object is not sensed in the region of interest.

In a second aspect, alone or in combination with the first aspect, process 800 includes the first information associated with the presence of the object indicates a first confidence level corresponding to the presence of the object, and the second information associated with the presence of the object indicates a second confidence level corresponding to the presence of the object.

In a third aspect, alone or in combination with one or more of the first and second aspects, transmitting the third information comprises transmitting, via a broadcast message, the third information to one or more of the first VUE, the second VUE, or a third VUE that does not monitor the region of interest, or transmitting, via a unicast message, the third information to the first VUE or the second VUE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
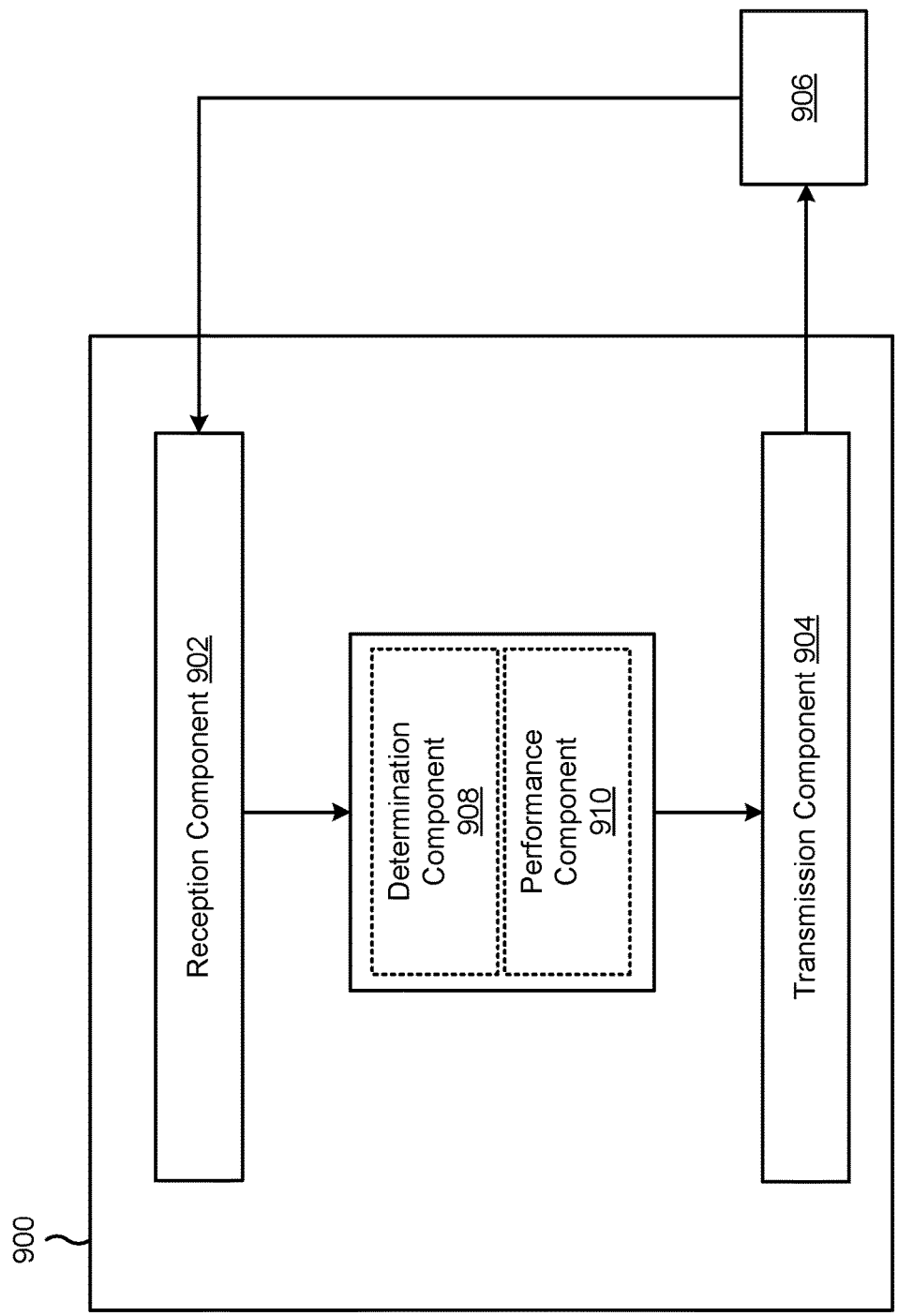
FIGS. 9-10 are block diagrams of example apparatuses for wireless communication, in accordance with various aspects of the present disclosure.

FIG. 9 is a block diagram of an example apparatus 900 for wireless communication. The apparatus 900 may be a first VUE, or a first VUE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, or a performance component 910, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first VUE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the first VUE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the first VUE described above in connection with FIG. 2. In some aspects, the transmission component 904 may be co-located with the reception component 902 in a transceiver.

The transmission component 904 may transmit, to a node, first information associated with a presence of an object in a region of interest based at least in part on a sensing of the region of interest performed by the first VUE. The reception component 902 may receive, from the node, second information associated with the presence of the object in the region of interest based at least in part on a sensing of the region of interest performed by a second VUE. The determination component 908 may determine whether the object is present in the region of interest based at least in part on the first information and the second information. The performance component 910 may perform an action based at least in part on whether the object is present in the region of interest.

The determination component 908 may determine that the object is present in the region of interest based at least in part on the first information and the second information.

The determination component 908 may determine the first information based at least in part on a monitoring of the region of interest, wherein the monitoring includes the sensing of the region of interest.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
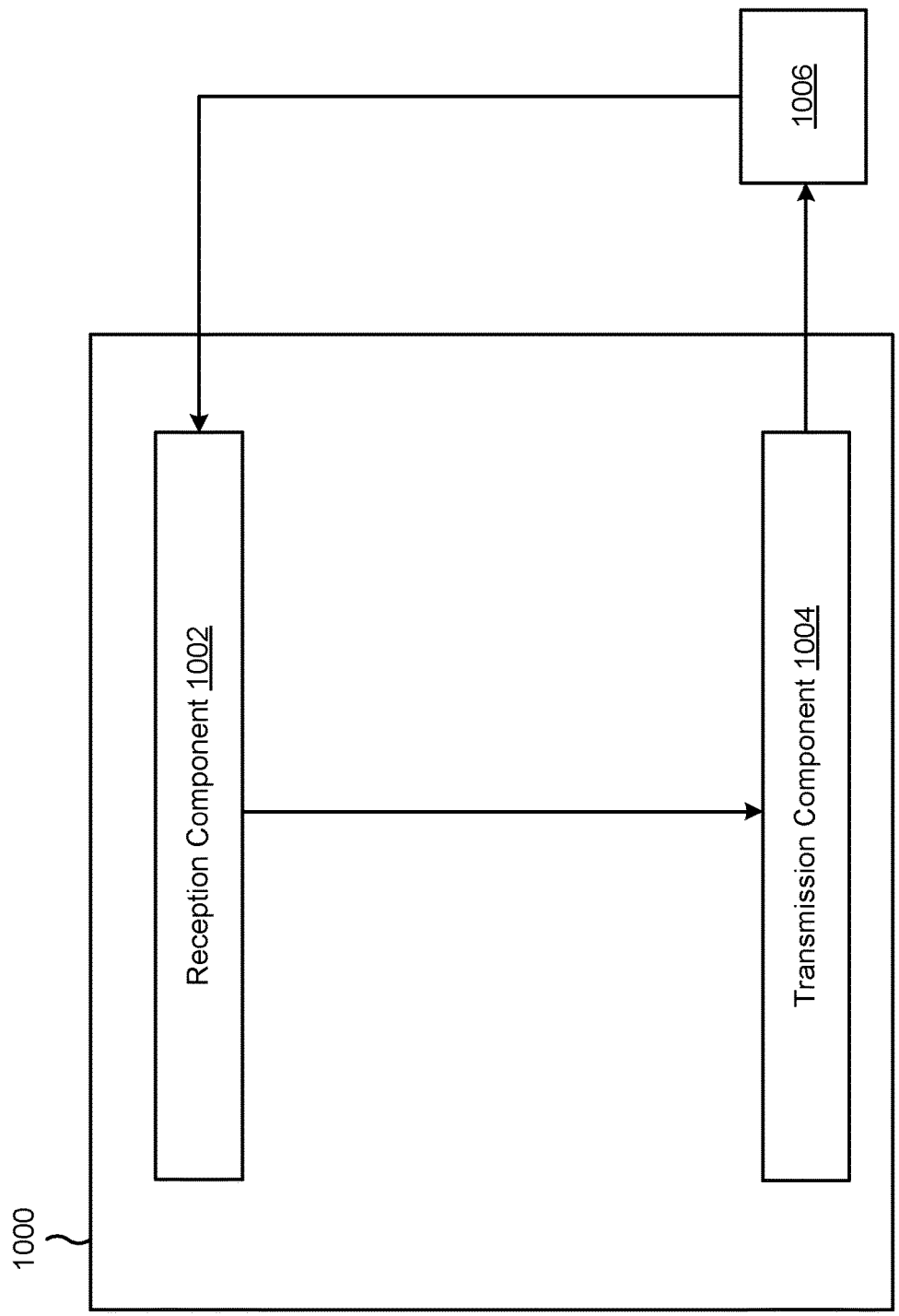

FIG. 10 is a block diagram of an example apparatus 1000 for wireless communication. The apparatus 1000 may be a node, or a node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the node described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the node described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the node described above in connection with FIG. 2. In some aspects, the transmission component 1004 may be co-located with the reception component 1002 in a transceiver.

The reception component 1002 may receive, from a first VUE, first information associated with a presence of an object in a region of interest based at least in part on a sensing of the region of interest by the first VUE. The reception component 1002 may receive, from a second VUE, second information associated with the presence of the object in the region of interest based at least in part on a sensing of the region of interest by the second VUE. The transmission component 1004 may transmit third information based at least in part on the first information and the second information, wherein the third information indicates a probability associated with the presence of the object in the region of interest based at least in part on one or more of the sensing of the region of interest by the first VUE and the sensing of the region of interest by the second VUE.

The transmission component 1004 may transmit, via a broadcast message, the third information to one or more of the first VUE, the second VUE, or a third VUE that does not monitor the region of interest.

The transmission component 1004 may transmit, via a unicast message, the third information to the first VUE or the second VUE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of aspects of the present disclosure:

Aspect 1: A method of wireless communication performed by a first vehicle user equipment (VUE), comprising: transmitting, to a node, first information associated with a presence of an object in a region of interest based at least in part on a sensing of the region of interest performed by the first VUE; receiving, from the node, second information associated with the presence of the object in the region of interest based at least in part on a sensing of the region of interest performed by a second VUE; determining whether the object is present in the region of interest based at least in part on the first information and the second information; and performing an action based at least in part on whether the object is present in the region of interest.

Aspect 2: The method of aspect 1, wherein the first information associated with the presence of the object in the region of interest indicates that the object is present in the region of interest or absent from the region of interest.

Aspect 3: The method of any of aspects 1 through 2, wherein the first information indicates that the object is absent from the region of interest and the second information indicates that the object is present in the region of interest, and further comprising: determining that the object is present in the region of interest based at least in part on the first information and the second information.

Aspect 4: The method of any of aspects 1 through 3, wherein the first information indicates that the object is present in the region of interest and the second information indicates that the object is absent from the region of interest, and further comprising: determining that the object is present in the region of interest based at least in part on the first information and the second information.

Aspect 5: The method of any of aspects 1 through 4, wherein the first information associated with the presence of the object includes a first value to indicate that the object is sensed in the region of interest or a second value to indicate that the object is not sensed in the region of interest.

Aspect 6: The method of any of aspects 1 through 5, wherein the first information associated with the presence of the object indicates a confidence level corresponding to the presence of the object.

Aspect 7: The method of any of aspects 1 through 6, wherein the second information indicates a probability associated with the presence of the object in the region of interest based at least in part on the sensing by the second VUE.

Aspect 8: The method of aspect 7, wherein the probability is based at least in part on: a number of VUEs other than the first VUE that report information indicating that the object is present in the region of interest, and a total number of VUEs other than the first VUE that report information associated with the presence of the object in the region of interest.

Aspect 9: The method of any of aspects 1 through 8, wherein: the region of interest is preconfigured at the first VUE; or the region of interest is configured at the first VUE by the node or a base station.

Aspect 10: The method of any of aspects 1 through 9, further comprising: determining the first information based at least in part on a monitoring of the region of interest, wherein the monitoring includes the sensing of the region of interest.

Aspect 11: The method of any of aspects 1 through 10, wherein receiving the second information comprises receiving the second information from the node via a broadcast message, and wherein the second information is based at least in part on the sensing of the region of interest performed by the first VUE and the sensing of the region of interest performed by the second VUE.

Aspect 12: A method of wireless communication performed by a node, comprising: receiving, from a first vehicle user equipment (VUE), first information associated with a presence of an object in a region of interest based at least in part on a sensing of the region of interest by the first VUE; receiving, from a second VUE, second information associated with the presence of the object in the region of interest based at least in part on a sensing of the region of interest by the second VUE; and transmitting third information based at least in part on the first information and the second information, wherein the third information indicates a probability associated with the presence of the object in the region of interest based at least in part on one or more of the sensing of the region of interest by the first VUE and the sensing of the region of interest by the second VUE.

Aspect 13: The method of aspect 12, wherein: the first information associated with the presence of the object includes a first value to indicate that the object is sensed in the region of interest or a second value to indicate that the object is not sensed in the region of interest; and the second information associated with the presence of the object includes a third value to indicate that the object is sensed in the region of interest or a fourth value to indicate that the object is not sensed in the region of interest.

Aspect 14: The method of any of aspects 12 through 13, wherein: the first information associated with the presence of the object indicates a first confidence level corresponding to the presence of the object; and the second information associated with the presence of the object indicates a second confidence level corresponding to the presence of the object.

Aspect 15: The method of any of aspects 12 through 14, wherein transmitting the third information comprises: transmitting, via a broadcast message, the third information to one or more of the first VUE, the second VUE, or a third VUE that does not monitor the region of interest; or transmitting, via a unicast message, the third information to the first VUE or the second VUE.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first vehicle user equipment (VUE), comprising:
transmitting, to a node, first information associated with a presence of an object in a region of interest based at least in part on a sensing of the region of interest performed by the first VUE;
receiving, from the node, second information indicating a probability associated with the presence of the object in the region of interest based at least in part on a sensing of the region of interest performed by a second VUE;
determining whether the object is present in the region of interest based at least in part on the first information and the second information; and performing an action based at least in part on whether the object is present in the region of interest.

2. The method of claim 1, wherein the first information associated with the presence of the object in the region of interest indicates that the object is present in the region of interest or absent from the region of interest.

3. The method of claim 1, wherein the first information indicates that the object is absent from the region of interest and the second information indicates that the object is present in the region of interest, and further comprising:
determining that the object is present in the region of interest based at least in part on the first information and the second information.

4. The method of claim 1, wherein the first information indicates that the object is present in the region of interest and the second information indicates that the object is absent from the region of interest, and further comprising:
determining that the object is present in the region of interest based at least in part on the first information and the second information.

5. The method of claim 1, wherein the first information associated with the presence of the object includes a first value to indicate that the object is sensed in the region of interest or a second value to indicate that the object is not sensed in the region of interest.

6. The method of claim 1, wherein the first information associated with the presence of the object indicates a confidence level corresponding to the presence of the object.

7. The method of claim 1, wherein the second information indicates the probability associated with the presence of the object in the region of interest based at least in part on the sensing by the second VUE.

8. The method of claim 1, wherein the probability is based at least in part on: a number of VUEs other than the first VUE that report information indicating that the object is present in the region of interest, and a total number of VUEs other than the first VUE that report information associated with the presence of the object in the region of interest.

9. The method of claim 1, wherein:
the region of interest is preconfigured at the first VUE; or
the region of interest is configured at the first VUE by the node or a base station.

10. The method of claim 1, further comprising:
determining the first information based at least in part on a monitoring of the region of interest, wherein the monitoring includes the sensing of the region of interest.

11. The method of claim 1, wherein receiving the second information comprises receiving the second information from the node via a broadcast message, and wherein the second information is based at least in part on the sensing of the region of interest performed by the first VUE and the sensing of the region of interest performed by the second VUE.

12. A method of wireless communication performed by a node, comprising:
receiving, from a first vehicle user equipment (VUE), first information associated with a presence of an object in a preconfigured region of interest based at least in part on a sensing of the preconfigured region of interest by the first VUE;
receiving, from a second VUE, second information associated with the presence of the object in the preconfigured region of interest based at least in part on a sensing of the preconfigured region of interest by the second VUE; and
transmitting third information based at least in part on the first information and the second information, wherein the third information indicates a probability associated with the presence of the object in the preconfigured region of interest based at least in part on one or more of the sensing of the preconfigured region of interest by the first VUE and the sensing of the preconfigured region of interest by the second VUE.

13. The method of claim 12, wherein:
the first information associated with the presence of the object includes a first value to indicate that the object is sensed in the preconfigured region of interest or a second value to indicate that the object is not sensed in the preconfigured region of interest; and
the second information associated with the presence of the object includes a third value to indicate that the object is sensed in the preconfigured region of interest or a fourth value to indicate that the object is not sensed in the preconfigured region of interest.

14. The method of claim 12, wherein:
the first information associated with the presence of the object indicates a first confidence level corresponding to the presence of the object; and
the second information associated with the presence of the object indicates a second confidence level corresponding to the presence of the object.

15. The method of claim 12, wherein transmitting the third information comprises:
transmitting, via a broadcast message, the third information to one or more of the first VUE, the second VUE, or a third VUE that does not monitor the preconfigured region of interest; or
transmitting, via a unicast message, the third information to the first VUE or the second VUE.

16. A first vehicle user equipment (VUE) for wireless communication, comprising:
a memory; and
one or more processors coupled to the memory, the one or more processors configured to:
transmit, to a node, first information associated with a presence of an object in a region of interest based at least in part on a sensing of the region of interest performed by the first VUE;
receive, from the node, second information indicating a probability associated with the presence of the object in the region of interest based at least in part on a sensing of the region of interest performed by a second VUE;
determine whether the object is present in the region of interest based at least in part on the first information and the second information; and
perform an action based at least in part on whether the object is present in the region of interest.

17. The first VUE of claim 16, wherein the first information associated with the presence of the object in the region of interest indicates that the object is present in the region of interest or absent from the region of interest.

18. The first VUE of claim 16, wherein the first information indicates that the object is absent from the region of interest and the second information indicates that the object is present in the region of interest, and wherein the one or more processors are configured to:
determine that the object is present in the region of interest based at least in part on the first information and the second information.

19. The first VUE of claim 16, wherein the first information indicates that the object is present in the region of interest and the second information indicates that the object is absent from the region of interest, and wherein the one or more processors are configured to:
  determine that the object is present in the region of interest based at least in part on the first information and the second information.

20. The first VUE of claim 16, wherein the first information associated with the presence of the object includes a first value to indicate that the object is sensed in the region of interest or a second value to indicate that the object is not sensed in the region of interest.

21. The first VUE of claim 16, wherein the first information associated with the presence of the object indicates a confidence level corresponding to the presence of the object.

22. The first VUE of claim 16, wherein the second information indicates the probability associated with the presence of the object in the region of interest based at least in part on the sensing by the second VUE.

23. The first VUE of claim 16, wherein the probability is based at least in part on: a number of VUEs other than the first VUE that report information indicating that the object is present in the region of interest, and a total number of VUEs other than the first VUE that report information associated with the presence of the object in the region of interest.

24. The first VUE of claim 16, wherein:
  the region of interest is preconfigured at the first VUE; or
  the region of interest is configured at the first VUE by the node or a base station.

25. The first VUE of claim 16, wherein the one or more processors are further configured to:
  determine the first information based at least in part on a monitoring of the region of interest, wherein the monitoring includes the sensing of the region of interest.

26. The first VUE of claim 16, wherein the one or more processors, when receiving the second information, are configured to receive the second information from the node via a broadcast message, and wherein the second information is based at least in part on the sensing of the region of interest performed by the first VUE and the sensing of the region of interest performed by the second VUE.

27. A node for wireless communication, comprising:
  a memory; and
  one or more processors coupled to the memory, the one or more processors configured to:
    receive, from a first vehicle user equipment (VUE), first information associated with a presence of an object in a preconfigured region of interest based at least in part on a sensing of the preconfigured region of interest by the first VUE;
    receive, from a second VUE, second information associated with the presence of the object in the preconfigured region of interest based at least in part on a sensing of the preconfigured region of interest by the second VUE; and
    transmit third information based at least in part on the first information and the second information, wherein the third information indicates a probability associated with the presence of the object in the preconfigured region of interest based at least in part on one or more of the sensing of the preconfigured region of interest by the first VUE and the sensing of the preconfigured region of interest by the second VUE.

28. The node of claim 27, wherein:
  the first information associated with the presence of the object includes a first value to indicate that the object is sensed in the preconfigured region of interest or a second value to indicate that the object is not sensed in the preconfigured region of interest; or
  the second information associated with the presence of the object includes a third value to indicate that the object is sensed in the preconfigured region of interest or a fourth value to indicate that the object is not sensed in the preconfigured region of interest.

29. The node of claim 27, wherein:
  the first information associated with the presence of the object indicates a first confidence level corresponding to the presence of the object; or
  the second information associated with the presence of the object indicates a second confidence level corresponding to the presence of the object.

30. The node of claim 27, wherein the one or more processors, when transmitting the third information, are configured to:
  transmit, via a broadcast message, the third information to one or more of the first VUE or the second VUE; or
  transmit, via a unicast message, the third information to the first VUE or the second VUE.

* * * * *